United States Patent
Linsky et al.

(10) Patent No.: US 6,279,132 B1
(45) Date of Patent: Aug. 21, 2001

(54) CONCATENATED ERROR CONTROL METHOD AND SYSTEM FOR A PROCESSING SATELLITE UPLINK

(75) Inventors: Stuart T. Linsky, San Pedro; David A. Wright, Solana Beach; Gefferie H. Yee-Madera, San Gabriel; Donald C. Wilcoxson, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/161,843

(22) Filed: Sep. 28, 1998

(51) Int. Cl.$^7$ .................................................. H03M 13/00
(52) U.S. Cl. .......................... 714/755; 714/752; 714/762
(58) Field of Search ...................... 375/323, 262; 714/785, 755, 752, 762; 455/63, 430, 12.1

(56) References Cited

U.S. PATENT DOCUMENTS

| | | | |
|---|---|---|---|
| 4,247,943 | * 1/1981 | Malm | 375/323 |
| 4,701,923 | 10/1987 | Fukasawa et al. . | |
| 4,800,570 | 1/1989 | Perrotta et al. . | |
| 5,206,864 | * 4/1993 | McConnell | 714/755 |
| 5,307,377 | 4/1994 | Chouly et al. . | |
| 5,473,601 | 12/1995 | Rosen et al. . | |
| 5,490,168 | 2/1996 | Phillips et al. . | |
| 5,511,079 | 4/1996 | Dillon . | |
| 5,563,897 | * 10/1996 | Pyndiah et al. | 714/755 |
| 5,600,663 | 2/1997 | Ayanoglu et al. . | |
| 5,608,739 | * 3/1997 | Snodgrass et al. | 714/785 |
| 5,625,624 | 4/1997 | Rosen et al. . | |
| 5,699,365 | 12/1997 | Klayman et al. . | |
| 5,729,557 | 3/1998 | Gardner et al. . | |
| 5,734,962 | * 3/1998 | Hladik et al. | 455/12.1 |
| 5,742,619 | * 4/1998 | Hassan | 714/755 |
| 6,014,550 | * 1/2000 | Rikkinen | 455/63 |
| 6,031,874 | * 2/2000 | Chennakeshu et al. | 375/262 |
| 6,070,074 | * 5/2000 | Perahia et al. | 455/430 |

OTHER PUBLICATIONS

Lau A. et al: "A Sequential Soft–Decision Decoder for Reed–Solomon Codes Applied to Encoded PSK in Rayleigh–Fading Channels" IEEE Transactions on Vehicular Technology, US, IEEE Inc. New York, vol. 45, No. 1 Feb. 1996 pp. 97–104, XP000594671, p. 97, left–hand column, para 2, p. 98, left–hand column, para 1, p. 99, left–hand column, para 5.

Display exhibits at the Cincinnati Fire Show Mar. 23, 1994 showing On/Off switch, dimmer, battery and liquid crystal.

* cited by examiner

Primary Examiner—Albert Decady
Assistant Examiner—David Ton
(74) Attorney, Agent, or Firm—Robert W. Keller

(57) ABSTRACT

Information is transmitted in an uplink to a satellite by applying an outer code to an information block to form an outer coded block. The outer coded block is then inner coded when a short block code is applied, thereby producing a concatenated coded block.

23 Claims, 3 Drawing Sheets

CONCATENATED ERROR CONTROL METHOD AND SYSTEM FOR A PROCESSING SATELLITE UPLINK

This application is related to U.S. patent application Ser. No. 09/069,681, entitled Concatenated Coding System for Satellite Communications, filed Apr. 29, 1998.

BACKGROUND OF THE INVENTION

The present invention relates to error control coding in communications systems. In particular, the present invention relates to inner codes for use with concatenated codes.

In digital satellite communication systems, error correcting coding is often used to obtain more efficient link power usage at the expense of less efficient spectral usage. In other words, additional error coding allows transmitters to send with less power at the expense of somewhat increased bandwidth. Applying error correcting codes to information in the uplink signal at the ground station helps reduce the effect of numerous sources of corrupting interference. Thus, error correcting codes attempt to lower the Bit Error Rate (BER) (generally defined as the ratio of incorrectly received information bits to the total number of received information bits) of the coded information, as received, to acceptable levels.

Among the available techniques for such error correction coding is concatenated coding. Generally, concatenated coding refers to the sequence of coding in which a second coding operation is performed upon already encoded data. The two levels of codes are generally referred to as the inner code and the outer code. The outer code of the concatenated code is the first code applied at the ground station, while the inner code is the second code applied. At the receiver, such as a receiving satellite, the inner code (if decoded at all) is decoded first followed by the outer code.

The first code the ground station applies is typically a block code. A codeword in a block code consists of K information bits, and R parity bits. The codeword is therefore N=K+R bits in length.

Block codes are generally organized on the basis of bits. A variety of block codes known as Reed-Solomon codes may be used as the outer code to encode the uplink signals. Reed-Solomon block codes, however, are organized on the basis of groups of bits referred to as codeletters. To form codeletters, an incoming serial bit stream may be reorganized as sequences of m individual bits (a codeletter). The Reed-Solomon code has K information codeletters (rather than bits), R parity codeletters, and a total codeword length of N=K+R codeletters. For 8-bit codeletters, a Reed-Solomon codeword is typically 255 codeletters in length. Allowing the codeword to correct up to 16 or fewer codeletters requires 32 parity codeletters, thereby leaving 223 data codeletters (for an effective code rate of $223/255$ (approximately $7/8$)).

An inner code that is often applied is a convolutional code. A convolutional code is an error correcting code which transforms an input sequence of bits into an output sequence of bits through a finite-state machine, where additional bits are added to the data stream to allow for error-correcting capability. Typically the amount of error-correction capability is proportional to the amount of additional bits added and the memory present in the finite-state machine (encoder). The constraint length, L, of a convolutional code is proportional to the finite-state machine's memory. The rate of the convolutional code (k/n, with k<n) describes how many additional bits are added for every k information bits (input) (i.e., n-k bits added for each k information bits.) Viterbi decoding may be used to decode a convolutional code. Unfortunately, the decoding complexity of a convolutional code increases exponentially with the constraint length.

As an additional measure, uplink signals may be interleaved before transmission. The process of interleaving reorders coded sequences prior to transmission and is inverted after reception and decoding of the inner code but prior to decoding of the outer code. Interleaving is most beneficial when the output of the inner decode contains a burst of errors. This is because interleaving spreads burst errors out in the sequences deinterleaved after reception and thus increases the likelihood of accurate decoding. Unfortunately, interleaving coded sequences takes time, power, and computational resources, and adds to the overall complexity of the communication system.

Commonly used coding methods present two difficulties when processing information received on an uplink. First, an interleaver is impractical in most forms of uplink access because of the significant latency (i.e., additional delay) arising when interleaving is applied to a low speed application. Second, the process of Viterbi decoding, though readily realizable, consumes a significant amount of spacecraft power, which is a scarce resource. The second problem is due primarily to the fact that, for convolutional inner codes, decoding complexity increases exponentially with the constraint length.

A need has long existed for a simple and effective error control method that may be used in the uplink of a processing satellite communications system.

BRIEF SUMMARY OF THE INVENTION

One object of the present invention is to produce a coding gain on the uplink without interleaving and the latency associated therewith.

Another object of the invention is to apply coding to information transmitted in an uplink that produces a coding gain, but that requires relatively low spacecraft power to decode.

An additional object of the invention is to apply coding to information transmitted in an uplink that produces significant coding gain over simple repetition coding.

Yet another object of the present invention is to apply a relatively short inner block code in a concatenated coding scheme, such that a codeletter of the outer code corresponds to one or more codewords of the inner code.

A still further object of the present invention is to apply a relatively short inner block code in a concatenated coding scheme that produces biorthogonal signal waveforms.

The preferred embodiment of the present invention provides a method for coding information transmitted in an uplink to a satellite. The method includes the step of applying an outer code to an information block to form an outer coded block. The outer coded block is then inner coded by applying a short block code without an intervening interleaver to the code letters at the inner code, thereby producing a concatenated coded block. The concatenated coded block is then transmitted to a satellite.

The step of inner coding preferably applies an (8,4) block code to produce codewords which form a biorthogonal constellation. The step of inner coding may alternatively apply another short block code such as a Nordstrom-Robinson (16,8) code. The short block code applied may, for example, include an identity sub-matrix and a code sub-matrix to generate a systematic code. The step of inner coding may generate, for example, sixteen or two-hundred-fifty-six unique inner codewords for the (8,4) or (16,8) case respectively.

Another embodiment of the invention is a coded information signal embodied in a carrier wave. The carrier wave, for example, may be a 30 GHz uplink carrier. The coded information signal includes a plurality of transmitted waveforms. Each waveform is tranformed into a sequence of modulated symbols representing a codeword of a predetermined codeset. Additionally, with the (8,4) code, each transmitted waveform is a member of a biorthogonal waveform set that includes each transmitted waveform that may be generated from the codeset.

Yet another embodiment of the invention is a satellite communication system. The satellite communication system generally includes one or more ground stations in communication with at least one satellite. The ground station includes an outer coder which is adapted to apply an outer code to an information block, thereby forming an outer coded block. An inner coder is also provided and is adapted to encode the outer coded block by applying a short block code, thereby producing a concatenated coded block. The ground station also includes a transmitter that transmits the concatenated coded block to a satellite.

The inner coder of the system may be adapted to apply, for example, an (8,4) block code or a Nordstrom-Robinson (16,8) code. Furthermore, the (8,4) inner encoder is preferably adapted to produce codewords which form a biorthogonal constellation when mapped onto QPSK waveforms. The inner encoder may generate, for example, sixteen or two-hundred-fifty-six of such blocks, corresponding, respectively, to half or all of a codeletter of the outer code.

The satellite includes a demodulator adapted to demodulate a received QPSK waveform to recover an observable corresponding to a transmitted inner code word. A short block code decoder then determines a nearest inner codeword for the observable. The recovered information content of a set of such inner codewords is aggregated to provide an observable corresponding to the outer codeword. The satellite also includes an outer decoder adapted to decode the outer, Reed-Solomon, codeword.

DETAILED DESCRIPTION OF THE INVENTION

Figure 1:
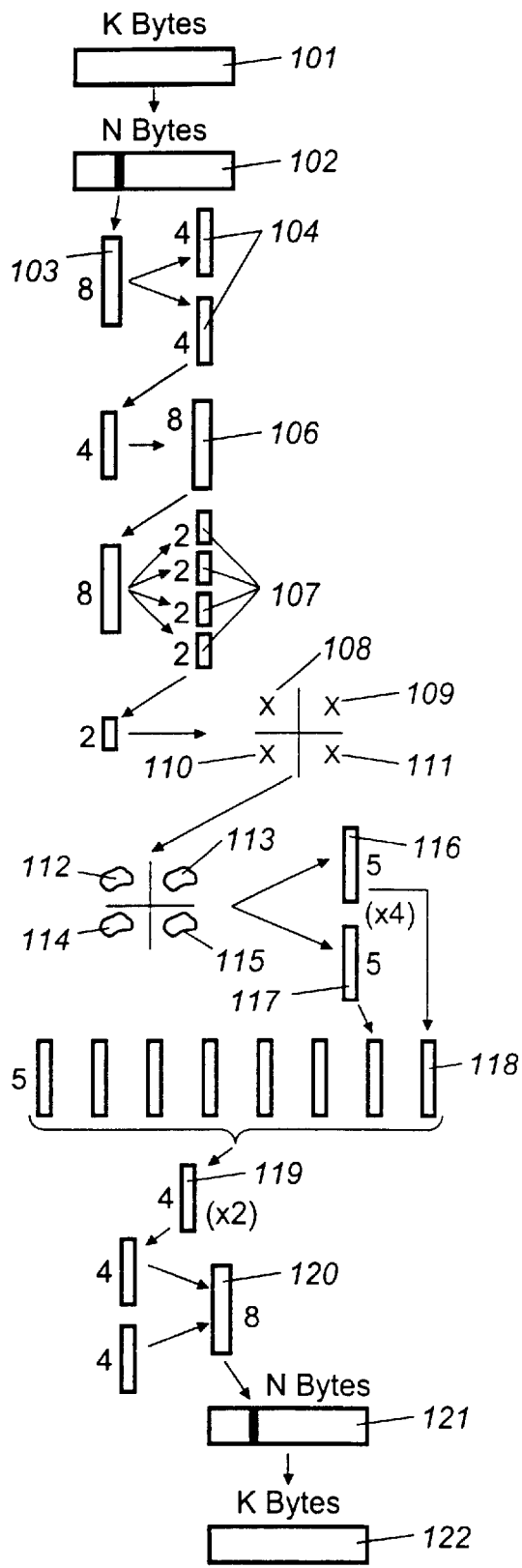
FIG. 1 is a flow chart illustrating data units as they are acted on in the present satellite communication system.

Turning now to FIG. 1, that figure presents a data chart 100 illustrating the data units as manipulated by the present coding method. The data chart 100 shows a K-byte (that is, an 8 bit codeletter) information block 101 and an N-byte outer coded block 102. The data chart 100 also shows several data units, including an eight bit codeletter 103, which is divided to form a pair of four bit nibbles 104, an inner codeword of 8 bits 106, which is partitioned into four dibits 107. Each dibit maps onto one of four transmitted quatenary symbols 108, 109, 110, 111 shown as well as received quatenary symbols 112, 113, 114, 115 which include noise. Five bit soft decisions 116, 117 are shown as well as an aggregation of soft decisions 118. The data chart 100 also shows four bit decoded values 119 and an aggregated 8-bit byte 120. Additionally, the data chart 100 shows an N-byte received block 121 and a K-byte decoded information block 122.

Figure 2:
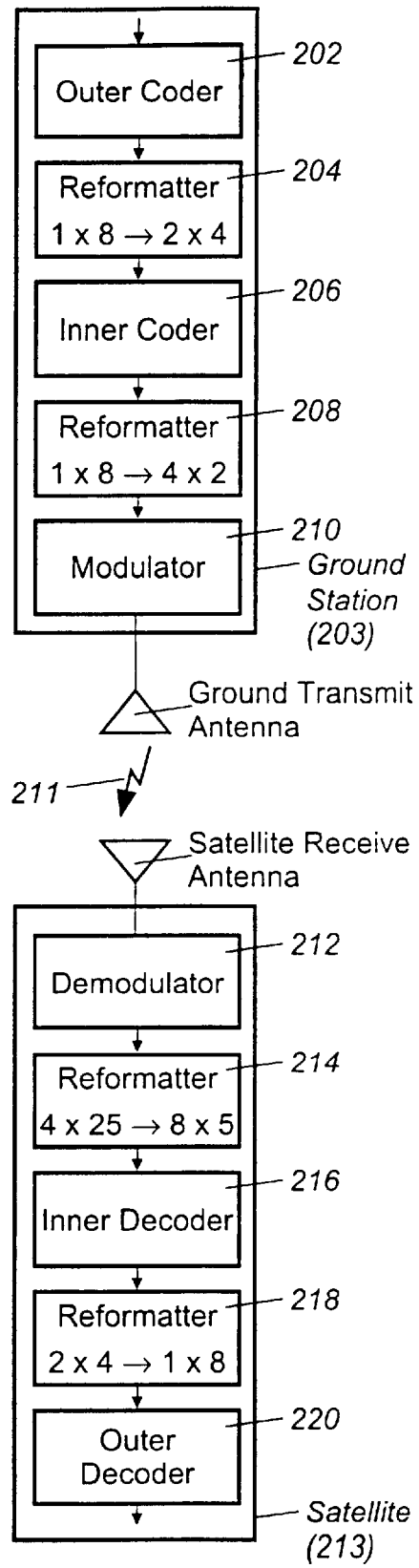
FIG. 2 illustrates ground station and satellite components which act upon the data units shown in FIG. 1.

Referring now to FIG. 2, that figure shows a satellite communication system 200 and the individual components that operate on the data units in the chart 100. Ground station 203 includes an outer coder 202, a first ground station reformatter 204, an inner coder 206, a second ground station reformatter 208, and a modulator 210. The ground station also includes a ground transmit antenna that communicates over a satellite uplink 211 with a satellite receive antenna. The satellite 213 includes a demodulator 212, a first satellite reformatter 214, a short block code decoder 216, a second satellite reformatter 218, and an outer decoder 220.

Figure 3:
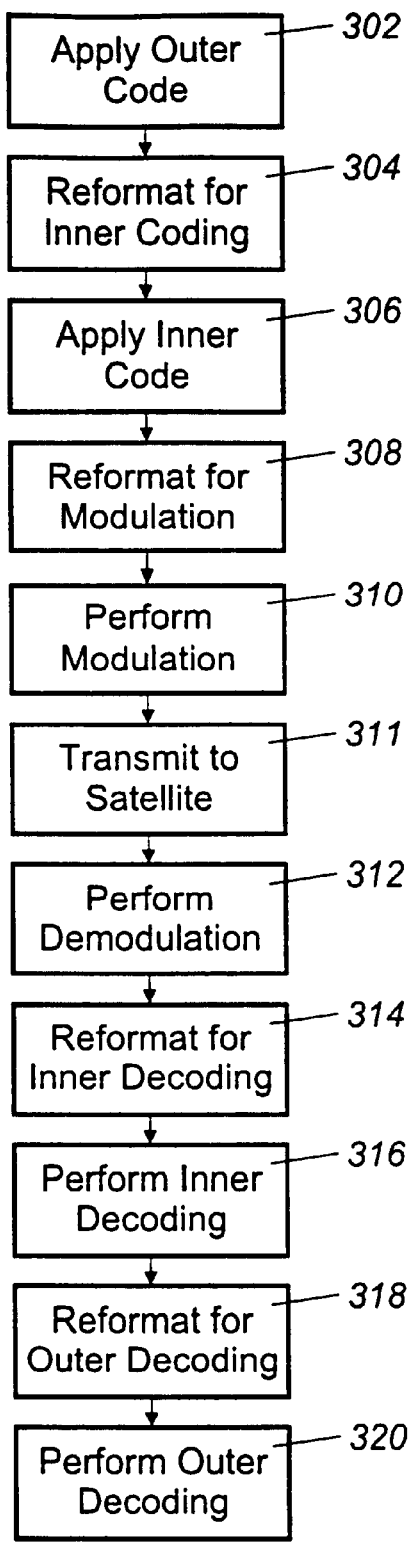
FIG. 3 is a flow chart showing the steps the ground station and satellite undertake in encoding and decoding data according to the present invention.

Turning now to FIG. 3, that figure presents a flow chart 300 showing the steps that the satellite communication system takes in encoding and decoding data. Flow chart 300 includes an apply outer code step 302, a reformat for inner code step 304, an apply inner coding step 306, a reformat for modulation step 308, and a modulation step 310. The flow chart 300 also illustrates a transmit to satellite step 311. The decoding portion of flow chart 300 shows a demodulation step 312, a reformat for perform inner decoding step 314, a perform inner decoding step 316, a reformat for outer decoding step 318, and a perform outer decoding step 320.

Turning back to FIG. 2, an outer coder 202, for example a Reed-Solomon encoder, expands the K-byte information block 101 to include a parity field, resulting in an N-byte outer coded block 102. This corresponds to the outer coding step 302 of FIG. 3.

A Reed-Solomon code based on the Galois field of 256 elements may be used as the outer code. In that case, the fundamental block length is 255. The information bearing capacity is the fundamental block length reduced by 2*t, where t is the number of byte errors that can be corrected. As an example, when t=12, the information bearing capacity is 255−(12*2)=231 symbols.

In a satellite using Asynchronous Transfer Mode (ATM) methods, however, a desirable block size preferably contains multiple 53-byte ATM cells. Thus, 212(4*53) is one desirable number for the number of information bearing elements. Allowing, as before, t=12, the total block length is 236. This is a shortened Reed-Solomon code expressed as (236,212). The outer coder 202 may use the (236,212) code or any other code, however.

In applying the inner code, each eight bit codeword 103 may be treated as two four bit nibbles 104 after the outer code has been applied. The reformatter 204 may therefore comprise hardware logic or software that presents each four bit nibble 104 in turn to the encoder 206. This corresponds to the reformat for inner coding step 304 of FIG. 3.

Subsequently, an inner coder 206, preferably a biorthogonal coder, applies the short block code as the inner code to each codeletter, or portion thereof, outer coded block, and each four bit nibble 104 in particular. The short block code may be, for example, an (8,4) linear block code, a (12,8) block code, or a (16,8) block code. Preferably, the inner code is an (8,4) linear block code which is in the family of Reed-Muller codes, one of which is represented by the generator matrix:

$$G = \begin{bmatrix} 1 & 0 & 0 & 0 & | & 1 & 1 & 1 & 0 \\ 0 & 1 & 0 & 0 & | & 1 & 1 & 0 & 1 \\ 0 & 0 & 1 & 0 & | & 1 & 0 & 1 & 1 \\ 0 & 0 & 0 & 1 & | & 0 & 1 & 1 & 1 \end{bmatrix}.$$

The generator matrix G applies a biorthogonal code and generates sixteen different inner codewords 106. In a biorthogonal code, the set of inner codewords 106 forms a biorthogonal constellation when mapped onto four quaternary phase-shift keying symbols each of which may be located at one of four positions 108, 109, 110, 111 in phase space. The generator matrix G includes a four-by-four identity sub-matrix to the left of the dotted partition line in G. The identity sub-matrix allows G to produce "systematic" code. A systematic code reproduces information entering the inner coder 206 one for one in the concatenated coded block 106. The generator matrix G also includes a parity generating sub-matrix to the right of the dotted partition line in G. The parity generating sub-matrix adds extra code bits, each of which is a combination of the bits in the nibble 104 on which G operates. As a result, the four bit nibbles 104 are transformed into eight bit bytes as an inner codeword 106

The (8,4) short block generating matrix referenced above produces the following results when its transpose acts upon a nibble 104:

$$G^T N = \begin{bmatrix} 1 & 0 & 0 & 0 \\ 0 & 1 & 0 & 0 \\ 0 & 0 & 1 & 0 \\ 0 & 0 & 0 & 1 \\ 1 & 1 & 1 & 0 \\ 1 & 1 & 0 & 1 \\ 1 & 0 & 1 & 1 \\ 0 & 1 & 1 & 1 \end{bmatrix} \begin{bmatrix} i_1 \\ i_2 \\ i_3 \\ i_4 \end{bmatrix} =$$

$$[i_1, i_2, i_3, i_4, i_1+i_2+i_3, i_1+i_2+i_4, i_1+i_3+i_4, i_2+i_3+i_4]^T.$$

While G provides one particular example of a preferred generating matrix, other generating matrices for short block codes, including (8,4) block codes, may be used.

In an alternative embodiment, a Nordstrom-Robinson (16,8) code may be used as the short block inner code in the inner coder 206. Although the (8,4) short block code is linear, the present invention may use non-linear short block codes (e.g., the Nordstrom-Robinson (16,8) code.) As another example, a (12,8) short block code may be applied in the inner coder 206. The application of the alternative short block codes cited above would be applied to the full 8 bit codeletter 103 rather than the nibbles 107 and corresponds to inner coding step 306 of FIG. 3.

The second ground station reformatter 208 reformats the inner codewords 106 after the inner code is applied at step 306. Preferably, the second ground station reformatter 208 treats each eight bit inner codeword 106 as a sequence of four dibits 107 per inner codeword 106, each dibit 107 containing a two bit portion. Thus, the second reformatter 208 may comprise hardware logic or software that presents the dibits 107 to the modulator 210. Additionally, although represented as first and second reformatters 204, 208 in FIG. 2, a single CPU may perform both reformatting functions in the ground station 203. The second ground station reformatting corresponds to the reformat for modulation step 308 of FIG. 3.

In the modulator 210, each of the four dibits 107 of each inner codeword 106 is consecutively mapped onto one of four QPSK symbols each of which may be located at one of four positions 108, 109, 110, 111. This corresponds to the modulation step 310 of FIG. 3. Sixteen possible waveforms (one for each inner codeword and each of which exists over a time period of four symbol intervals) are thus available to represent transmitted information. These sixteen waveforms have the mathematical property of biorthogonality due to the particular implementation of G, above. In other words, among the sixteen waveforms, each member is orthogonal with fourteen and antipodal with the remaining waveform. Thus, the sixteen waveforms form a biorthogonal signal set.

Once the dibits 107 are mapped onto their corresponding QPSK symbols, the ground transmit antenna transmits the resulting waveform over the satellite uplink 211 to the satellite 213, where the satellite receive antenna receives it. This transmission over the satellite uplink 211 corresponds to transmit to satellite step 311 of FIG. 3.

Under typical uplink conditions, the coding gain realized from using the biorthogonal code is 5.0 decibels (dB), gross, and 2.0 dB, net (i.e., above that produced by simple repetition). The difference in net and gross coding gain is due to the fact that the coded waveform sent is twice as long as the four bits of original information contained therein. In other words, 3 dB of the coding gain is due to repetition. The 2 dB net coding gain compares with a 4.0 dB net coding gain for a rate ½, constraint-length 7, convolutional code with soft decision Viterbi decoding, and 0.0 dB net gain for simple repetition. Simple repetition does not achieve any net coding gain because the entire coding gain is, of course, due to repetition.

At the satellite 213, the demodulator 212 demodulates the received waveform (each symbol of which may be degraded by noise as shown by quatenary received symbols each of which tends to cluster in regions 112, 113, 114, 115 corresponding to the transmitted point 108, 109, 110, 111). This corresponds to the demodulating step 312 of FIG. 3. The demodulator 212 demodulates each of the four received symbols (representing each dibit in the received waveform) into a pair of soft decisions 116, 117 typically of five bits each. Thus, four pairs of soft decisions 118 are produced for each received inner codeword, constituting the observable for the inner decoder. The additional bits in the soft decisions 116, 117 (compared to the dibits 108, 109, 110, 111) arise from the soft decision nature of the demodulator 212. The process of soft decisioning involves outputting an estimate of a signal value along with an indication of its confidence in this estimate (in the extra bits).

Subsequently, the short block code decoder 216 determines the nearest biorthogonal codeword based on the set of soft decisions 118. Each inner decoder 216 step yields a decoded nibble 119 that represents the nearest codeword.

Generally, interleaving is only required when using a convolutional code and associated Viterbi decoder as the nature of the decoding process is such that, when an error is made in decoding a convolutional code, a string of errors extending over several codeletters of the outercode typically follow. Because each inner codeword 106 generated with a short block code is independent of the other inner codewords 106, errors in decoding the biorthogonal inner code are limited to a single code letter of the Reed-Solomon code. As a result, interleaving need not be used in the present coding system. This provides the benefit of avoiding latency that arises when interleaving (and consequently necessary deinterleaving) is applied and further simplifies the processing of uplink signals at the satellite.

The two nibbles 119 are aggregated into an 8-bit byte 120 by the second satellite reformatter 218. The reformatter 218 may therefore comprise hardware logic or software that aggregates the nibbles 119 into an 8-bit codeword 120. As each byte is received that forms a complete observable block 121 for the outer decoder, the outer decoder 220 decodes this observable block to form a K-byte information block 122. This reformatting and decoding correspond to the reformatting for outer decoding step 318 and perform outer decoding 320 step of FIG. 3. Additionally, although represented as first and second reformatters 214, 218 in FIG. 2, a single CPU may perform both reformatting functions in the satellite 213.

The demodulator 212 uses less bus power than would a comparable Viterbi decoder because the Reed-Muller (8,4) code permits highly efficient mapping of soft-decision observations from the demodulator to the codeword nearest thereto in eight dimensional Euclidean space. The mapping of the soft decision observations represents an optimum decision; i.e., the decoding process is maximum likelihood. In other words, the bus power and computing complexity required to decode the waveforms generated by the present invention are dramatically less than in past systems.

Figure 4:
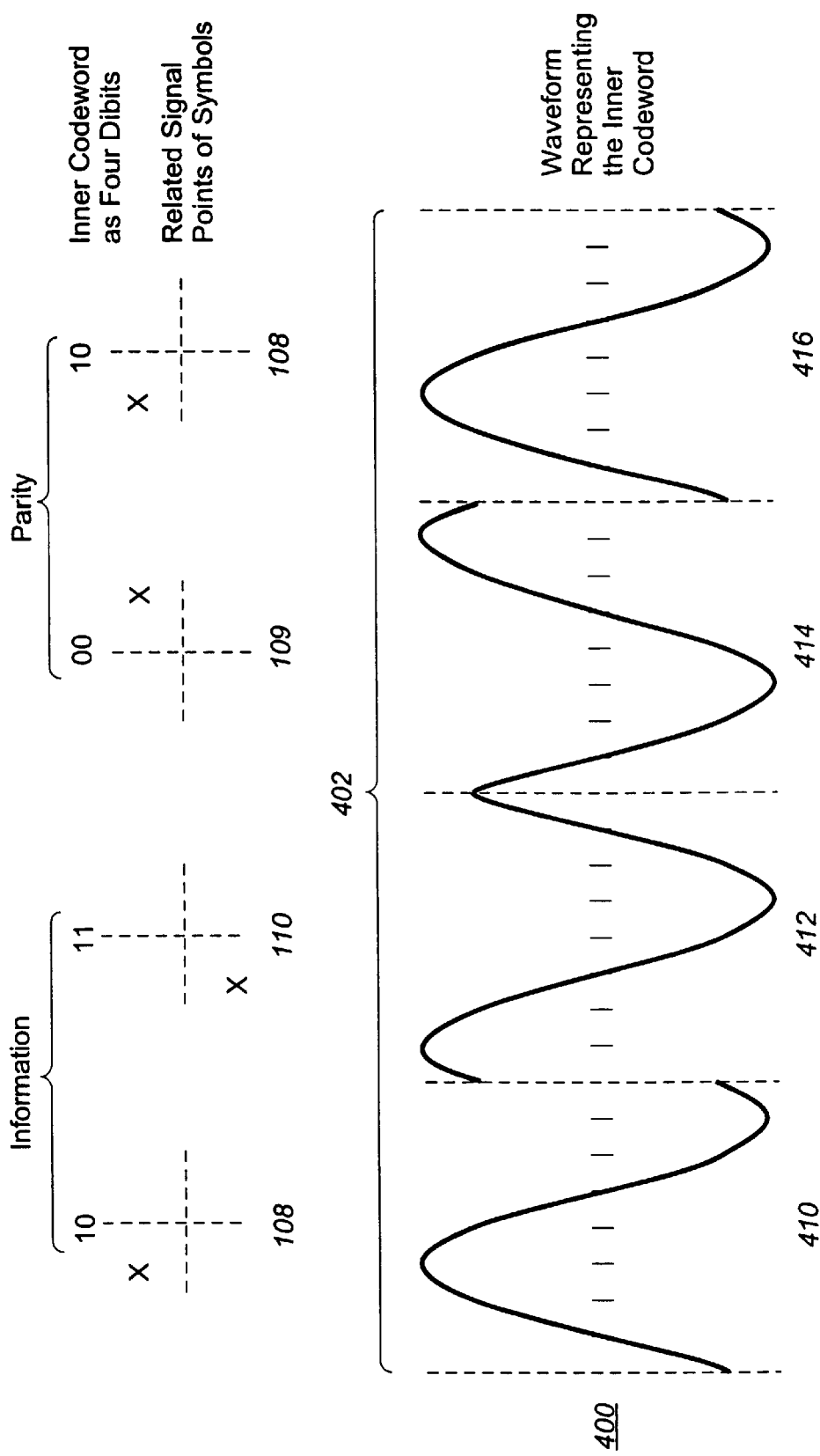
FIG. 4 illustrates a coded information signal including several transmitted waveforms.

Turning now to FIG. 4, a portion of a coded information signal 400 is presented. The coded information signal 400 includes a series of waveforms representing an inner codeword and includes multiple modulated symbols. In particular, the waveform 402 includes the modulated symbols 410–416. The modulated symbols 410–416 may represent QPSK symbols, for example, those generated by the modulator 210 in response to the codewords generated by G, above.

Each of the waveforms 402 is a member of a biorthogonal waveform set. Such a set may be generated by QPSK modulation of the sixteen codewords produced by G, as an example. Each waveform 402 thus represents an inner codeword. In general, G generates sixteen codewords and thus the modulator 210 produces 16 biorthogonal waveforms each comprised of four QPSK symbols, some or all of which may be present in the coded information signal 400. However, other short block code generators may be used that generate more or fewer codewords and thus a greater or smaller set of waveforms.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for communicating coded information in an uplink to a satellite, the method comprising the steps of:
    applying an outer code to an information block to form an outer coded block comprising codeletters;
    inner coding said outer coded block by applying a short block code comprising codewords to produce a concatenated coded block such that a codeletter of the outer code corresponds to one or more codewords of the inner code;
    generating biorthogonal code waveforms using symbols in response to the concatenated coded block; and
    transmitting said waveforms.

2. The method of claim 1, wherein the step of inner coding comprises applying an (8,4) block code.

3. The method of claim 2 wherein said step of inner coding comprises producing codewords which form a biorthogonal constellation when mapped onto QPSK symbols.

4. The method of claim 3 wherein said step of inner coding comprises applying a systematic code.

5. The method of claim 4 wherein said step of inner coding comprises applying a systematic (8,4) code representing the generating matrix:

$$\begin{bmatrix} 1 & 0 & 0 & 0 & 1 & 1 & 1 & 0 \\ 0 & 1 & 0 & 0 & 1 & 1 & 0 & 1 \\ 0 & 0 & 1 & 0 & 1 & 0 & 1 & 1 \\ 0 & 0 & 0 & 1 & 0 & 1 & 1 & 1 \end{bmatrix}.$$

6. The method of claim 1 wherein the step of inner coding comprises producing codewords which form a biorthogonal constellation when mapped onto QPSK symbols.

7. The method of claim 6 wherein said step of applying an outer code comprises applying a Reed-Solomon code.

8. The method of claim 6 wherein the step of inner coding comprises generating sixteen (16) biorthogonal codewords.

9. The method of claim 6 wherein the step of inner coding comprises generating two-hundred-fifty-six (256) biorthogonal codewords.

10. The method of claim 1 wherein said step of inner coding comprises applying a Nordstrom-Robinson (16,8) code.

11. A coded information signal embodied in a carrier wave, the coded information signal comprising:
    a plurality of transmitted waveforms, each transmitted waveform comprising:
        a sequence of modulated symbols representing a codeword of a predetermined codeset; and wherein
        each of the transmitted waveforms is a member of a biorthogonal waveform set comprising each transmitted waveform resulting from modulation of each codeword in said codeset, each codeword in the predetermined codeset comprising a codeword produced by the following short block code generator matrix:

$$\begin{bmatrix} 1 & 0 & 0 & 0 & | & 1 & 1 & 1 & 0 \\ 0 & 1 & 0 & 0 & | & 1 & 1 & 0 & 1 \\ 0 & 0 & 1 & 0 & | & 1 & 0 & 1 & 1 \\ 0 & 0 & 0 & 1 & | & 0 & 1 & 1 & 1 \end{bmatrix}$$

and wherein said biorthogonal waveform set has sixteen (16) members.

12. The coded information signal of claim 11, wherein each codeword in said predetermined codeset is a codeword produced by a short block code generator matrix.

13. The coded information signal of claim 11, wherein each sequence of modulated symbols is a sequence of QPSK modulated symbols.

14. A satellite communication system comprising:
    at least one ground station comprising
        an outer coder adapted to apply an outer code to an information block to form an outer coded block comprising codeletters;
        a short block code inner coder adapted to encode said outer coded block to produce a concatenated coded block using a short block code comprising codewords such that a codeletter of the outer code corresponds to one or more codewords of the inner code;

a modulator using symbols adapted to produce a biorthogonal code waveform representing said concatenated coded block; and a transmitter for transmitting said waveform in an uplink to a satellite.

15. The satellite communication system of claim 14 wherein said satellite comprises:

a demodulator adapted to demodulate said waveform;

a short block code decoder; and an outer decoder adapted to decode said codewords.

16. The satellite communication system of claim 14 wherein said short block code inner coder is an (8,4) block code encoder.

17. The satellite communication system of claim 14 wherein said short block code inner coder is a biorthogonal constellation inner coder and wherein said modulator uses QPSK symbols.

18. The satellite communication system of claim 16 wherein said short block code inner encoder is a biorthogonal constellation inner coder and wherein said modulator uses QPSK symbols.

19. The satellite communication system of claim 14 wherein said short block code inner coder is a Nordstrom-Robinson (16,8) inner coder.

20. The satellite communication system of claim 17 wherein said short block code inner encoder is a short systematic block coder.

21. The satellite communication system of claim 20 wherein said short block code inner encoder comprises the generating matrix:

$$\begin{bmatrix} 1 & 0 & 0 & 0 & 1 & 1 & 1 & 0 \\ 0 & 1 & 0 & 0 & 1 & 1 & 0 & 1 \\ 0 & 0 & 1 & 0 & 1 & 0 & 1 & 1 \\ 0 & 0 & 0 & 1 & 0 & 1 & 1 & 1 \end{bmatrix}.$$

22. A method for communicating coded information in an uplink to a satellite, the method comprising the steps of:

applying an outer code to an information block to form an outer coded block;

inner coding said outer coded block by applying a systematic short block code to produce a concatenated coded block comprising codewords which form a biorthogonal constellation when mapped onto modulated symbols, said systematic short block code comprising a systematic (8,4) code representing the generating matrix:

$$\begin{bmatrix} 1 & 0 & 0 & 0 & 1 & 1 & 1 & 0 \\ 0 & 1 & 0 & 0 & 1 & 1 & 0 & 1 \\ 0 & 0 & 1 & 0 & 1 & 0 & 1 & 1 \\ 0 & 0 & 0 & 1 & 0 & 1 & 1 & 1 \end{bmatrix}; \text{ and}$$

transmitting said concatenated coded block.

23. A satellite communication system comprising:

at least one ground station comprising an outer coder adapted to apply an outer code to an information block to form an outer coded block;

a short systematic block code biorthogonal constellation inner coder adapted to encode said outer coded block to produce a concatenated coded block, said inner coder comprising the generating matrix $$\begin{bmatrix} 1 & 0 & 0 & 0 & 1 & 1 & 1 & 0 \\ 0 & 1 & 0 & 0 & 1 & 1 & 0 & 1 \\ 0 & 0 & 1 & 0 & 1 & 0 & 1 & 1 \\ 0 & 0 & 0 & 1 & 0 & 1 & 1 & 1 \end{bmatrix};$$

a modulator adapted to produce a waveform representing said concatenated coded block; and a transmitter for transmitting said waveform in an uplink to a satellite.

* * * * *